United States Patent Office
3,493,467
Patented Feb. 3, 1970

3,493,467
REVERSIBLE BIOCHEMICAL REACTION
EMPLOYING A TRAPPING AGENT
William Drell, Pasadena, and Louis P. Gerber, Los
Angeles, Calif., assignors to Smith Kline & French
Laboratories, Philadelphia, Pa., a corporation of
Pennsylvania
No Drawing. Filed July 26, 1967, Ser. No. 656,032
Int. Cl. C12k 1/04, 1/10
U.S. Cl. 195—103.5                                7 Claims

ABSTRACT OF THE DISCLOSURE

The speed and accuracy of known enzymatic assays for alcohol-containing fluids is improved by using a novel reagent assay including: an appropriate carbonyl compound producing enzyme system, the coenzyme nicotinamide-adenine dinucleotide, a buffer, an acid neutralizing agent, and a novel trapping agent for the carbonyl compound produced from the alcohol selected from one of the aminooxyalkanoic acids, hydroxylamine-O-sulfonic acid, and aminooxyalkane sulfonic acids.

---

This invention relates to reagent mixtures useful for detecting and measuring substances based on producing carbonyl bearing compounds by enzymatic action.

In one aspect, the present invention relates to a novel reagent mixture. In another aspect it relates to a procedure for its use in the estimation of ethanol in body fluids and tissues. In yet another aspect it relates to an article of manufacture comprising a novel reagent mixture in hermetically sealed unitary form.

The determination of ethyl alcohol in breath, blood, and urine in man has become increasingly important; hence, it is more frequently required in law enforcement, with particular application to automobile traffic violations. Three classes or types of assay procedures are currently employed; namely, chemical, enzymatic, and gas chromotographic. Of these, the enzymatic methods affords the advantages of accuracy, high specificity for ethanol in body fluids, ease of performance in the laboratory, high sensitivity, and inexpensive equipment requirements.

The enzymatic method may be considered as a physiological procedure since the basis of the reaction involved is the same as that taking place within the animal body. When applied to the determination of ethyl alcohol present in blood or urine, the results are not influenced by the presence of volatile and oxidizable substances that would affect the values obtained by a strictly chemical procedure. Only the ethyl alcohol content would be determined in a properly taken blood or urine specimen by the enzymatic method, which assures specificity of the assay. The enzymatic approach assay for alcohol in body fluids affords reliable evidence for legal purposes because of its accuracy, sensitivity, and specificity.

The enzymatic method for the alcohol assay depends on the following chemical changes:

$$C_2H_5OH + NAD \rightleftharpoons CH_3CHO + NADH + H^+$$

The transfer of hydrogen from the alcohol to the coenzyme nicotinamide-adenine dinucleotide (NAD) with the concomitant production of acetaldehyde and reduced nicotinamide-adenine dinucleotide (NADH) is catalyzed by the enzyme, alcohol dehydrogenase (ADH).

The conversion of alcohol to acetaldehyde will go to completion, provided the latter product is trapped, and the reaction is carried out in an alkaline solution. In the presence of adequate amounts of the enzyme (ADH), ethanol is oxidized to acetaldehyde, with the formation of reduced NAD, which absorbs light at wave length 340 m$\mu$.

Measurement of the amount of change in light absorption permits calculation of the amount of alcohol converted during the assay, and thus its concentration in the specimen being assayed.

Heretofore, the aldehyde-trapping agent most generally used in this assay was semicarbazide, as the hydrochloride salt ($NH_2$—CO—NH—$NH_2 \cdot HCl$). Analogous compounds such as 1-(carboxymethyl) pyridinium chloride hydrazide and isonicotinic acid hydrazide can also serve to tie up the aldehyde.

However, the prior art trapping agents have serious drawbacks, since they are known to form complexes with NAD, which subsequently interfere with the enzymatic determination. The complexes can deteriorate on storage, giving rise to spurious photometric readings.

It is an object of this invention to provide a novel alcohol measuring reagent which employs a trapping agent for the carbonyl group of an aldehyde produced in the enzymatic oxidation of an alcohol present in a biological fluid.

It is still another object of this invention to provide an alcohol measuring reagent based on enzymatically catalyzed reactions, which employs a carbonyl trapping agent to which the enzymes are less susceptible to inhibition than has been possible heretofore.

It is a yet further object to provide a method of assaying for ethanol using a novel detecting reagent which employs trapping agents which have lesser human toxicity than those employed heretofore.

It is still a further object to provide a novel ethanol measuring reagent which employs a trapping agent that is relatively insensitive to high humidity and variable pH conditions for incorporation into a stable reagent used to assay for ethanol.

It is an additional object of this invention to provide a method of assaying for ethanol which includes a novel trapping agent in an assay reagent for ethanol in blood serum, which does not require serum deproteinzation prior to assay.

It is yet another object to provide an article of manufacture composed of a novel reagent mixture in a hermetically sealed unitary test form.

Further objects and advantages will become apparent to those skilled in the art from a study of the accompanying disclosure and appended claims.

It is known that hydroxylamine ($NH_2OH$) is an inhibitor of the enzymatic action of ADH. Surprisingly then, we have discovered that certain of its analogs serve as acetaldehyde-trapping agents in the aforedescribed assay for ethanol without interfering with the activity of ADH.

The particular trapping oxyamine agents employed depend on their ability to tie up the carbonyl compound in the presence of other reagent components. These agents are chosen from a class that includes aminooxyalkanoic acids having from two to five carbons. The higher alkyl homologs of aminooxyacetic acid up to five carbon atoms are equivalents useful in this invention.

The former group includes: aminooxyacetic acid (Eastman Kodak, New York), aminooxypropionic acid, aminooxybutyric acid, aminooxyvaleric acid, and α-amino-aminooxybutyric acid (Canaline from the jack bean).

Another preferred group of agents are the aminooxyalkane-O-sulfonic acids. In this category, preferred here is hydroxylamine-O-sulfonic acid (Allied Chemical Co.). Its alkyl homologs are equivalents in this invention: aminooxymethane sulfonic acid, aminooxypropane sulfonic acid, and aminooxybutane sulfonic acid.

Aminooxyacetic acid is reported in the literature, generally as a metabolic inhibitor, e.g., Favour et al., Chemical Abstracts, 42, 2316a (1948). However it has not been taught heretofore that aminooxy compounds could be advantageously utilized in the type enzymatic reactions addressed by the present invention.

The rate of hydrogen transfer is a function of several factors in the reaction mixture. When all factors are present in optimal amounts, this rate depends primarily on the rate of removal of acetaldehyde. The reaction proceeds slowly when semicarbazide is used as the trapping agent. The time to complete the reaction with semicarbazide is 30 to 60 minutes. It was discovered that the analogues of hydroxylamine noted above gave considerably faster reaction rates. For example, in a reaction mixture containing 0.035 molar aminooxyacetic acid, the time to complete the reaction varied from five to fifteen minutes, depending on the amount of ethanol present. The advantage of a shorter analytical procedure without loss of accuracy is manifest in situations where frequent and rapid assays for alcohol are the requirement.

Generally, aminooxy compounds are useful in the assay of an enzyme which catalyzes a reaction having an aldehyde or ketone as a product.

Alcohol dehydrogenase (ADH) is one of the less stable enzymes. The more stable preparations of the crystalline enzyme involve suspension in strong solutions of ammonium sulfate stabilized with sodium pyrophosphate and glycine. Such suspensions cannot be used in the reagent described below. Complete dryness is an essential property of all components of the reagent. Hence, lyophilization of the enzyme is imperative. The invention is directed to an article of manufacture in anhydrous form which is hermetically sealed to maintain stability during storage.

STABILIZATION OF THE ENZYME

Minimizing loss of activity during and after lyophilization is accomplished by suspending the crystalline enzyme in a solution containing stabilizing and activating substances as shown in the following example:

| | |
|---|---|
| Water ml | 100 |
| Gum acacia grams | 5.0 |
| Nicotinamide-adenine dinucleotide mg | 15 |
| Cysteine hydrochloride mg | 50 |
| Glycine g | 1.5 |
| Albumin g | 1.0 |
| Tris-Versene buffer at pH 8.0 ml | 5.0 |
| Alcohol dehydrogenase I.U. | 100,000 |

This solution is freeze-dried thoroughly and subsequently transferred in a dehumidified atmosphere. Loss of activity in the above process is less than 10%.

The preferred trapping agents are the aminooxyalkanoic acids, with aminooxyacetic acid being particularly advantageous. They have been discovered to be very stable upon intimate mixing with the reagent components as well as being unreactive. Moreover, the concentration limits were found to be less critical than with the prior art semicarbazide.

EXAMPLE

In one embodiment a solid reagent or assay material is prepared that is particularly adapted for measuring the amount of ethyl alcohol present in a serum. This reagent when fully prepared will consist of the dry mixture of the following substances:

Enzyme—Alcohol dehydrogenase
Buffer—Pyrophosphate, alkali metal salt
Stabilizer—Glycine and albumin
Trapping agent—Aminooxyacetic acid, Eastman Kodak Co., N.Y.
Neutralizing agent—Sodium carbonate
Coenzyme—Nicotinamide-adenine dinucleotide In order to prepare a large number of units of this assay material or reagent, the following procedure may be employed to produce a batch of a dry assay material or reagent that may then be divided into small quantities and packaged in containers such as capsules. Whenever quantities are specified, they are suitable for preparing a batch that will yield about 10,000 capsules. However, it should be understood that these values may be varied if it is desired to produce larger or smaller batches.

The first step in the procedure is to determine the amount of neutralizing agent, for example, sodium carbonate, required to neutralize the acidity of the novel trapping agents. To this end, two mixtures comprising the following chemicals in the amounts given are prepared:

| | Mg. |
|---|---|
| Sodium pyrophosphate dried | 400 |
| Aminooxyacetic acid | 200 |
| Glycine | 100 |
| Albumin | 27 |

Each mixture is dissolved in 27 ml. of distilled water. The amount of anhydrous sodium carbonate required to bring the solution to pH 8.8 to 9.2 is determined. This amount of sodium carbonate is then added to the second solution and the pH measured for purposes of verification. The amount of anhydrous sodium carbonate usually required to produce the desired pH range is about 280 mg. for the mixture described above.

The next step in the process is to assay the alcohol dehydrogenase preparation to be incorporated into the combined reagent. This assay may be carried out by any of the methods described in the literature. The preferred method is that of Vallee and Hoch [Proc. Nat. Acad. Sci., 41, 327 (1955)].

In this manner, the activity in International Units (I.U.) per milligram of lyophilized enzyme is established. This determines the amount of enzyme preparation required to give the desired activity in each capsule, preferably 200 I.U. A pilot batch is then prepared based on the amounts of sodium carbonate and ADH found necessary by the above assays. To this end, the following ingredients in dry form are mixed and uniformity obtained by appropriate tumbling:

| | Mg. |
|---|---|
| Sodium pyrophosphate | 400 |
| Aminooxyacetic acid | 200 |
| Glycine | 100 |
| Albumin | 27 |
| Alcohol dehydrogenase (200 I.U./mg.) | 1 |
| Nicotinamide-adenine dinucleotide | 31.6 |
| Sodium carbonate | 280 |
| | 1039.6 |

To confirm the suitability of this composition (pilot batch) for the assay of ethyl alcohol in biological fluids, a portion of the powder weighing 110 to 120 mg. is completely dissolved in 2.6 ml. of distilled water in an optical cuvette with 1 cm. light path. In order to establish the level of the activity contributed by the reagents themselves, that is, the reagent blank, the cuvette is placed in a photometer capable of measuring absorbance of light at a wave length of 340 m$\mu$. Since the reaction stops when all substrate, i.e., alcohol, has reacted, it is not necessary to keep constant the temperature in the cuvette. However, for quality control in manufacturing this product, it is helpful to compare the activities of different batches at the same temperature. A temperature of 30° C. was selected for assay purposes, although any temperature between 25° C. and 37° C. may be used.

The cuvette containing the reagent solution is allowed to remain in the photometer and measurement of the absorbance at 340 m$\mu$ is made at five minute intervals for 30 minutes.

A satisfactory reagent will show absorbancy increasing at a rate no greater than 0.001 per minute for the blank. A reagent blank increase of 0.001 per minute represents an equivalent of 0.01% w./v. ethyl alcohol in an assay taking 10 minutes. The pilot batch is further tested by assay of a reference standard. The preferred standard is absolute ethyl alcohol diluted with distilled water to a concentration of about 0.2% w./v. For the assay, the standard solution of ethanol is diluted 1+49 with distilled water. A 110–120 mg. portion of the reagent powder is dissolved in 2.7 ml. of distilled water to serve as a reagent blank. At the same time, a second 110 to 120 mg. portion is dissolved in 2.6 ml. of distilled water. Diluted alcohol standard (0.1 ml.) is added to the latter solution, mixed and allowed to stand about 5 minutes. The photometer is set at zero reading with the reagent blank in place. The absorbance of the standard solution is then measured. These steps are repeated at 5 minute intervals until two successive readings of the standard differ by 0.005 or less.

Usually, the reaction is over in 10 minutes. The final absorbance reading is numerically equal to the alcohol content in weight-volume percent. Recovery of alcohol should be 100% ±10% of the amount added for a satisfactory assay.

A full scale batch is prepared when a satisfactory assay is obtained with the components of the pilot batch. Since the essence of the stability of this composition resides in the complete dryness of the components, every precaution is taken to dehydrate the ingredients by vacuum drying and to conduct all weighing and mixing operation in a dehumidified atmosphere.

Sufficient powder for the production of 10,000 capsules is obtained from admixing the following components:

| | Grams |
|---|---|
| Sodium pyrophosphate, dried | 400 |
| Aminooxyacetic acid | 200 |
| Sodium carbonate, anhydrous | 280 |

A second mixture is prepared as follows:

| | Grams |
|---|---|
| Glycine | 100 |
| Albumin | 27 |
| Alcohol dehydrogenase, lyophilized | 1 |

The two powders are then combined and mixed to produce a homogeneous mixture. An aliquot of this powder (1.1 g.) is dissolved in 30 ml. of distilled or de-ionized water and the pH measured. The range pH 8.8 to 9.2 is satisfactory for the purpose of this assay. Activity of this solution is established by assay of the alcohol reference standard as described above. The complete reagent in dry powder form is now ready for packaging in units, one of which provides all the reagents necessary for a single assay for alcohol when dissolved in 2.6 ml. of water.

A packaging material suitable for protection of the dry powder is a gelatin capsule, which in turn, is enclosed in an envelope composed of laminated layers of moisture-proof materials to protect from moisture. Pellets of a drying agent such as alumina or silica gel are optionally placed within the envelope as a further means of protecting the powder from moisture.

Normally, in successive batches, there will be some variation in the size of the parts into which the entire mixture is divided as a result of variations in the activity of the ADH. In order to make all of the parts of essentially the same size in all batches, a standard size in excess of the largest size that will be required is chosen. A suitable quantity of a bulking and stabilizing agent such as mannitol may then be added to the mixture to bring its volume up to an amount that will insure each of the parts having a volume that will just fill the package.

Variations in the proportions or amount of the components of the reagent to be used are well within the skill of the art, as the invention resides in the novel combination of ingredients, rather than in any critical ranges. ADH, for example, need only be present in an amount sufficient to oxidize all of the alcohol present in the specimen being assayed; similarly, as to the amounts of the other reagent components.

The use of aminooxy compounds is not limited in utility to the direct determination of ethanol in biological fluids. Additionally, because of its striking effectiveness in promoting the aforedescribed alcohol assay, it may be usefully employed in the measurement of alcohol dehydrogenase itself, by appropriate modification of the reagent components, to include the alcohol in place of the enzyme.

The enzymatic estimation of alcohol can be applied to all those systems that contain or release ethanol, which do not inhibit the activity of ADH, or interfere with the absorption of light at wave length 340 m$\mu$.

Thus, the procedure described herein can be used as the indicator reaction in the estimation of trypsin activity. For this purpose trypsin is allowed to hydrolyze the substrate benzoyl-arginine ethyl ester. The rate of release of ethanol as measured by the ADH reaction will be a measure of tryptic activity. In a similar manner, activity of other enzymes such as proteases or esterases that liberate ethanol, propanol, or butanol can be estimated.

Aminooxy compounds exemplified by aminooxyacetic acid are also of advantage as carbonyl trapping agents in other enzymatic analyses. A particular example is the determination of lactic acid. When lactate dehydrogenase, NAD and an aminooxyalkanoic acid are combined, with a suitable buffer, stabilizer and neutralizing agent, as described above, a convenient reagent for the quantitative estimation of lactic acid results. Similarly beta-hydroxybutyric acid may be assayed for by the substitution of beta-hydroxybutyrate dehydrogenase in place of ADH.

Accordingly, the dry reagent may be dissolved directly into a standard amount of water so as to form a reagent solution. This liquid reagent is then mixed with the biological specimen to produce an enzymatic reaction. The extent of and the rate at which the reaction occurs will be a function of the quantity or amount of substrate, i.e., ethanol in the original specimen.

Every test within the scope of this invention, irrespective of the particular type of assay, will involve the conversion of a coenzyme from one form to another form wherein one form has an optical absorption at a predetermined wave length. Accordingly, the optical density of the specimen at that wave length will vary as a function of the unknown. Thus, by measuring the optical density of the medium at different times, it will be possible to compute the quantity or amount of activity of the unknown in the original specimen.

What is claimed is:

1. In a reversible biochemical reaction carried out in vitro in order to determine the activity of a dehydrogenase enzyme system or the concentration of a substrate for the dehydrogenase enzyme system including the steps of catalyzing the production of a carbonyl compound by the action of said dehydrogenase enzyme system on said substrate present in a specimen and carrying the reaction to completion by means of a trapping agent for said carbonyl compound, the improvement comprising: using as the trapping agent for said carbonyl compound, a compound from the group consisting of an aminooxyalkanoic acid having from two to five carbon atoms or an aminooxysulfonic acid having up to four carbons.

2. The method according to claim 1 wherein said trapping agent is aminooxyacetic acid.

3. In a method of assaying a specimen for ethanol including the steps of:

dissolving into water, a substantially anhydrous solid reagent material comprising the enzyme alcohol dehydrogenase; the coenzyme nicotinamide-adenine dinucleotide; a buffer comprising an alkali metal salt of pyrophosphate, and an acid neutralizing agent; thereby to produce a liquid reagent having a measurable optical density; mixing said liquid reagent with said specimen to form a specimen-reagent assay mixture; and determining the amount of change in optical density of the reacted specimen-reagent assay mixture;

the improvement comprising employing a trapping agent from the class that includes an aminooxyalkanoic acid having from two to five carbon atoms and an aminooxysulfonic acid having up to four carbon atoms, thereby causing said reaction to go to completion.

4. The method according to claim 3 wherein said trapping agent is aminooxyacetic acid.

5. An anhydrous mixture useful as a reagent for determining the ethanol content of body fluids comprising:
 (a) the enzyme alcohol dehydrogenase
 (b) the coenzyme nicotinamide-adenine dinucleotide;
 (c) a buffer
 (d) an acid nuetralizing agent;
 and which includes as a trapping agent for the acetaldehyde produced by said enzyme;
 (e) a compound from the group consisting of aminooxyalkanoic acids having from two to five carbon atoms and aminooxysulfonic acid and having up to four carbon atoms, thereby causing said reaction to go to completion.

6. The assay material of claim 5 wherein said trapping agent is aminooxyacetic acid.

7. An assay material according to claim 5 in hermetically sealed, measured unitary form.

References Cited

Colowick et al., Methods In Enzymology vol. III, pp. 253–255 (1957); vol. V, pp. 931–933 (1962).

ALVIN E. TANENHOLTZ, Primary Examiner

U.S. Cl. X.R.

195—63, 99